Dec. 28, 1954  W. L. PEHL  2,698,186
WHEEL MOUNTING MEANS FOR TRAILERS AND THE LIKE
Filed Aug. 11, 1953  2 Sheets-Sheet 1

Walter L. Pehl
INVENTOR.

BY *Clarence A. O'Brien*
*and Harvey B. Jacobson*
Attorneys

Dec. 28, 1954  W. L. PEHL  2,698,186
WHEEL MOUNTING MEANS FOR TRAILERS AND THE LIKE
Filed Aug. 11, 1953  2 Sheets-Sheet 2
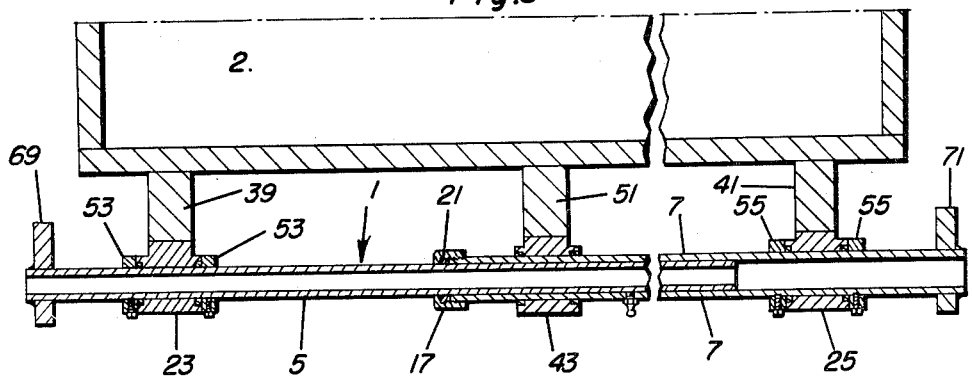
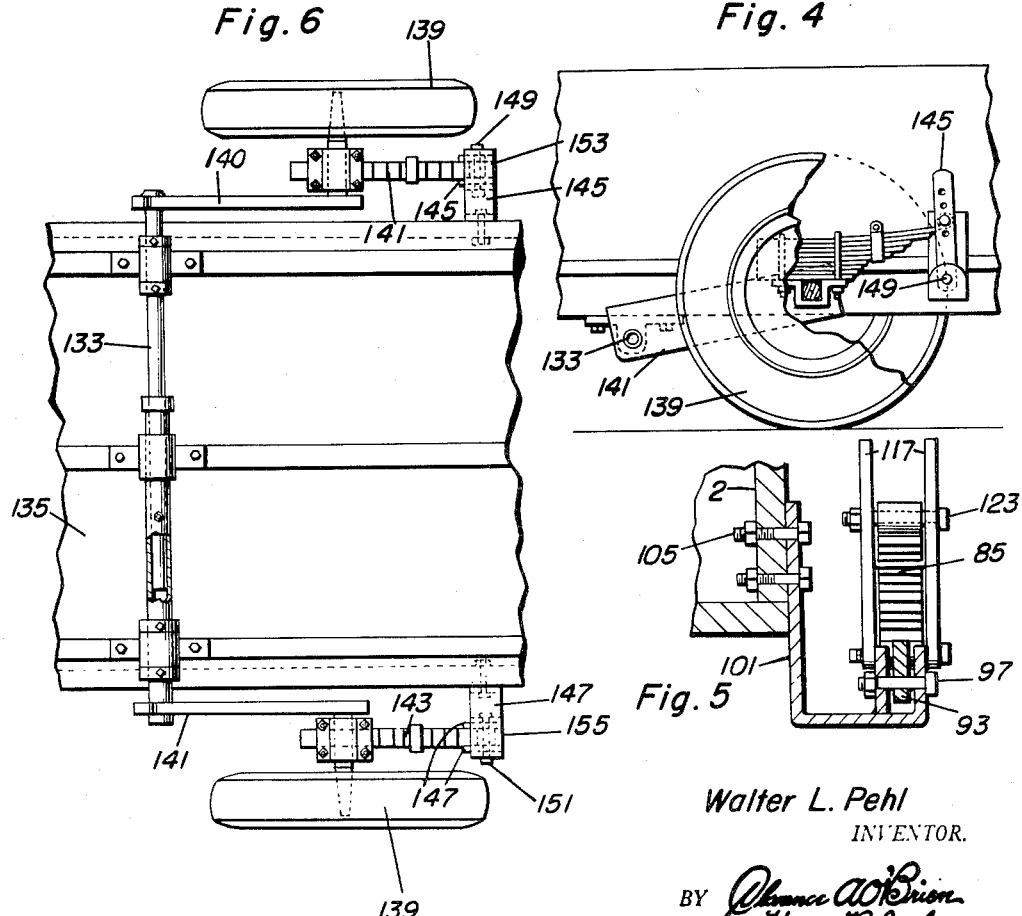
Walter L. Pehl
INVENTOR.

2,698,186

WHEEL MOUNTING MEANS FOR TRAILERS AND THE LIKE

Walter L. Pehl, Ballinger, Tex.

Application August 11, 1953, Serial No. 373,610

4 Claims. (Cl. 280—43)

My invention relates to improvements in wheel mountings for trailer bodies and the like.

The primary object of my invention is to provide wheel suspensions and axle structures for trailer bodies in which each of four wheels arranged in pairs are independently sprung and the wheels of each pair are adjustable laterally to accommodate between the same trailer bodies of different widths.

Another object is to provide for adjusting the wheels vertically relative to the body for raising or lowering the body.

Another object is to reduce side play in the spring suspensions and to provide for a very low center of gravity of the body if desired.

Still another object is to provide wheel suspensions and axle structure especially designed for quick easy attachment to and detachment from a trailer body and which are inexpensive to manufacture and service.

Other and subordinate objects together with the precise nature of my improvements will become apparent when the succeeding description and claims are read with reference to the accompanying drawings, in which:

Figure 3 is an enlarged view in vertical transverse section taken on the line 3—3 of Figure 1;

Figure 4 is a fragmentary view in side elevation partly broken away of a modified embodiment of the invention;

Figure 5 is an enlarged view in vertical transverse section taken on the line 5—5 of Figure 1; and Figure 6 is a fragmentary view in bottom plan, partly in section of the modified embodiment of the invention.

Figure 1:
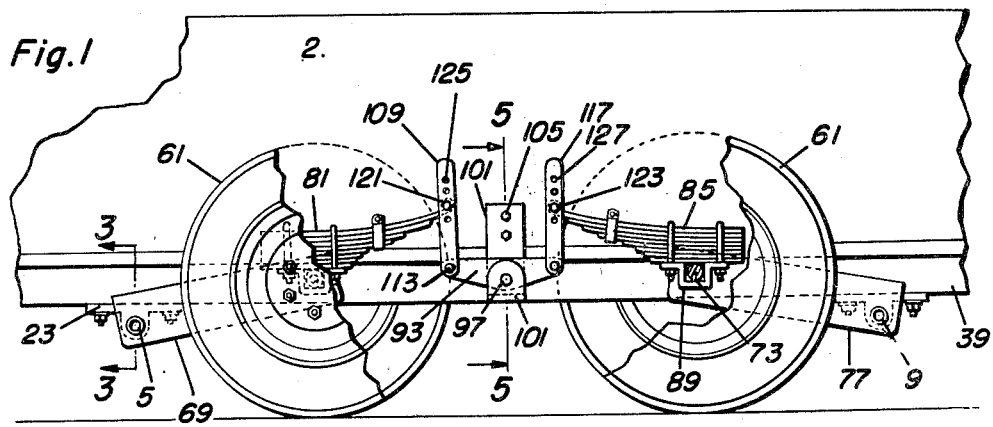
Figure 1 is a fragmentary view in side elevation partly broken away of a trailer body equipped according to my invention.
Figure 2:
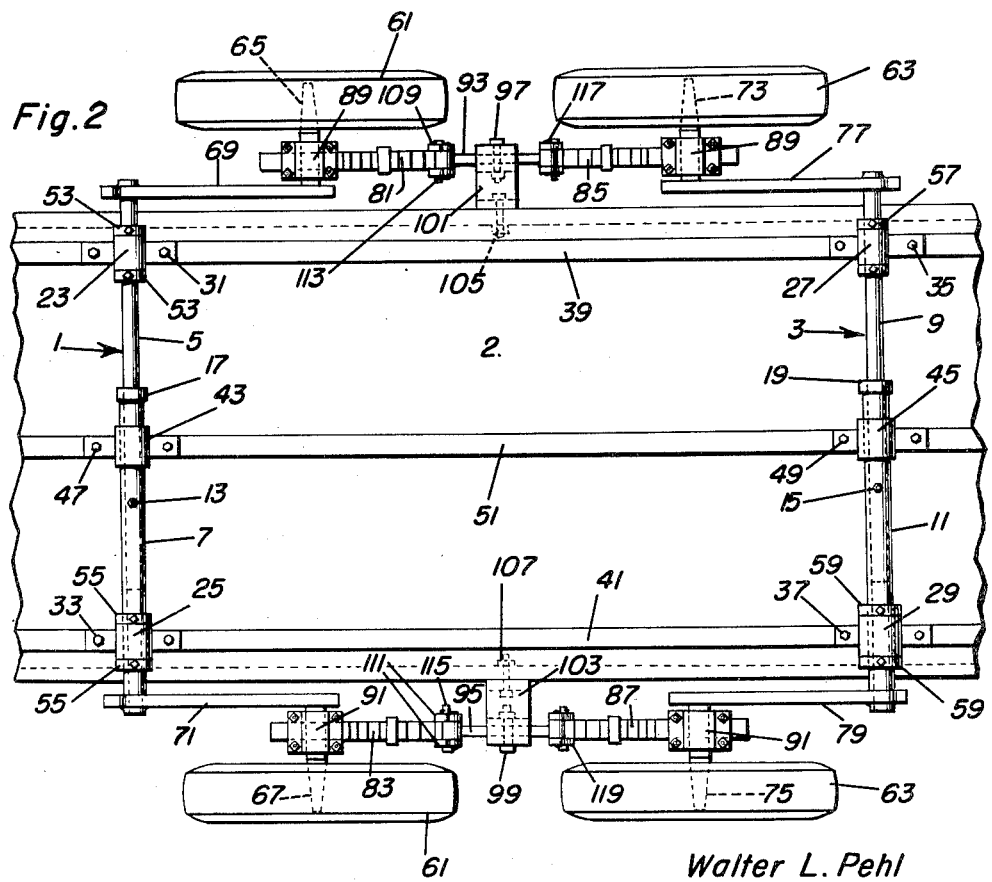
Figure 2 is a view in bottom plan of the same.

Referring to the drawings by numerals and first to Figures 1, 2, 3, 5, according to my invention a pair of axles 1, 3 are provided beneath the trailer body 2 at any suitable distance apart, each being of tubular telescopic construction for extension or contraction. For this purpose, the axles 1, 3 comprise, respectively, a pair of male and female telescopically adjustable sections 5, 7, 9, 11 and grease fittings 13, 15 in the female sections 7, 11 for rendering telescopic adjustment of said sections easy. Gland nuts 17, 19 are provided on the inner ends of the female sections 7, 11 for securing packing as at 21 at said ends.

Each axle 1, 3 is journaled adjacent its ends and in its approximate transverse center in bearings. For this purpose, a pair of bearing brackets 23, 25 are provided at the sides of the body 2 for the male and female sections 5, 7 and another pair 27, 29 for the male and female sections 9, 11, these brackets being bolted as at 31, 33, 35, 37 to bottom side beams 39, 41 on said body 2, and bearing brackets 43, 45 for the female sections 7, 11 are bolted as at 47, 49 to a longitudinal bottom beam 51 on said body 2.

Set collars 53, 55 arranged in pairs on the male and female sections 5, 7 on opposite sides of the bearing brackets 23, 25 and similarly arranged set collars 57, 59 on the male and female sections 9, 11, provide means for holding said sections in telescopically adjusted position and also serve as grease retainers for said brackets.

Pairs of ground wheels 61, 63 at opposite sides of the body 2 are associated with the axles 1, 3, respectively, between said axles. The pair of wheels 61 associated with axle 1, is mounted on lateral spindles 65, 67 on the free ends of crank arms 69, 71 fixed on the outer ends of the male and female sections 5, 7 so that said wheels 61 are independently movable vertically by virtue of rocking movement of said sections 5, 7. The pair of wheels 63 associated with axle 3 are mounted in like manner for the same purpose on lateral spindles 73, 75 on the free ends of crank arms 77, 79 fast on the outer ends of the male and female sections 9, 11. It will be noted that the pair of crank arms 69 and the pair 77 extend toward each other and incline upwardly from the axles 1, 3.

The pair of wheels 61 are spring suspended by means of a pair of cantilever multiple leaf springs, 81, 83 on opposite sides of the body 2, and the pair of wheels 63 by a pair of similar springs 85, 87. The springs 81, 83 are fixed at corresponding ends by clamps 89, 91 to the spindles 65, 67 and the springs 85, 87 are similarly fixed to the spindles 73, 75 by clamps 89, 91. The pairs of springs 81, 83 and 85, 87 extend toward each other parallel with the body 2. The other ends of the springs 81, 83, 85 and 87 are connected to the body 2 by the following shackle means. A pair of rockers 93, 95 at opposite sides of the body 2 are pivoted as at 97, 99 intermediate their ends for vertical rocking movement in a pair of L-shaped vertical brackets 101, 103 bolted, as at 105, 107 to opposite sides of the body 2. Pairs of upstanding links 109, 111 are pivoted at lower ends thereof as at 113, 115 to corresponding ends of the rockers 93, 95 and similar pairs of links 117, 119 to the other ends of said rockers. Said other ends of the springs 81, 83 are pivoted between the pairs of links 109, 111 by horizontal pins, as at 121 and said other ends of the springs 85, 87 are likewise pivoted between the pairs of links 117, 119 by horizontal pivot pins as at 123.

The pivot pins 121, 123 are selectively insertable in vertically spaced openings, as at 125, 127 in the pairs of links 109, 111, 117, 119 whereby the springs 81, 83, 85, 87 may be adjusted vertically to adjust the wheels 61, 63 vertically relative to the body 2 to raise or lower said body.

Referring now to the operation of the invention as so far described, inasmuch as the male and female sections 5, 7 of axle 1, also the male and female sections 9, 11 of axle 3 are relatively rotatable, the pairs of wheels 61, 63 are associated with said axles may move vertically independently relative to the body 2 while the pair of wheels 61 are supported by the cantilever springs 81, 83 and the pair 63 are supported by the cantilever springs 85, 87. The rockers 93, 95 and pivoted pairs of links 109, 111, 117, 119 compensate for longitudinal play of said springs resulting from angular movement of said wheels about the axis of the axles 1, 3. By telescopically adjusting the axles 1, 3 in the manner already described, said axles may be extended or contracted to fit the wheel mountings to bodies 2 of different widths. The manner in which the body 2 may be raised or lowered will be clear from the foregoing description.

In the modified embodiment shown in Figures 4 and 6, a single axle 133 corresponding for instance to axle 1, is mounted in the same manner on the trailer body 135, and with this is associated a pair of wheels 140 mounted on the crank arms 139, 141, corresponding to crank arms 69, 71. The wheels 139 are spring suspended in the same manner as in the preferred embodiment except that in the shackle means connecting the springs 141, 143 to the body 135, the pairs of links 145, 147 to which the springs 141, 143 are pivoted, are pivotally connected as at 149, 151 directly to brackets 153, 155 corresponding to brackets 101, 103. Otherwise, the construction and arrangement is the same as in the first described embodiment.

The foregoing will suffice to impart a clear understanding to my invention without further explanation.

Manifestly the invention is susceptible of modification without departing from the inventive concept and right is herein reserved to modifications falling within the scope of the invention as herein disclosed.

What I claim is:

1. Wheel mounting means for a vehicle body comprising a pair of laterally spaced transverse axles journaled beneath said body, each including a pair of telescopic male and female sections relatively rotatable, and a pair of crank arms at opposite ends of each axle and opposite sides of the body, fixed on the male and female sections of the axles for vertical swinging independently by relative rotation of said sections, a pair of ground wheels associated with each axle and mounted on the crank arms thereof for vertical movement with the crank arms, said pairs of crank arms extending toward each other, a pair of cantilever springs at opposite sides of the body for each pair of crank arms attached to and supporting the same, the pairs of springs extending toward each other, shackle means mounted to opposite sides of the body between the pairs of springs, and means for connecting said springs to said shackle means at different vertically spaced points thereon for lowering and raising said wheels relative to said body.

2. Wheel mounting means according to claim 1, said male and female sections being telescopically adjustable to extend or contract the axles in correspondence with vehicle bodies of different widths.

3. Wheel mounting means according to claim 1, said shackle means comprising pivoted rockers and pairs of upright links pivoted to said rockers and between which said springs are connected.

4. Wheel mounting means according to claim 1, said crank arms having wheel mounting spindles thereon to which said springs are attached.

References Cited in the file of this patent

UNITED STATES PATENTS

| Number | Name | Date |
|---|---|---|
| 1,840,599 | Nibbe | Jan. 12, 1932 |
| 1,939,863 | Seiter | Dec. 19, 1933 |
| 2,013,890 | Kuns | Sept. 10, 1935 |